United States Patent
Lee et al.

(10) Patent No.: US 12,151,559 B2
(45) Date of Patent: Nov. 26, 2024

(54) DISPLAY APPARATUS FOR VEHICLE

(71) Applicants: Hyundai Motor Company, Seoul (KR); Kia Corporation, Seoul (KR)

(72) Inventors: Hong Heui Lee, Suwon-si (KR); Myung Hoe Kim, Seoul (KR); Seung Sik Han, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 202 days.

(21) Appl. No.: 17/956,158

(22) Filed: Sep. 29, 2022

(65) Prior Publication Data

US 2023/0129916 A1    Apr. 27, 2023

(30) Foreign Application Priority Data

Oct. 27, 2021 (KR) .......................... 10-2021-0144168

(51) Int. Cl.
*B60K 35/00* (2024.01)
*B60K 35/10* (2024.01)
(Continued)

(52) U.S. Cl.
CPC ................ *B60K 35/00* (2013.01); *B60R 1/12* (2013.01); *B60R 1/25* (2022.01); *B60R 11/0229* (2013.01); *B60K 35/10* (2024.01); *B60K 35/28* (2024.01); *B60K 35/60* (2024.01); *B60K 2360/111* (2024.01); *B60K 2360/176* (2024.01); *B60K 2360/682* (2024.01); *B60K 2360/794* (2024.01); *B60R 2001/1253* (2013.01); *B60R 2011/0021* (2013.01); *B60R 2011/0082* (2013.01); *B60R 2011/0084* (2013.01); *B60R 2011/0085* (2013.01); *B60R 2300/8046* (2013.01)

(58) Field of Classification Search
None
See application file for complete search history.

(56) References Cited

U.S. PATENT DOCUMENTS

2009/0316057 A1* 12/2009 Campbell .............. B60K 35/00
   348/836
2010/0053480 A1* 3/2010 Jaworski ............. B60R 11/0235
   348/837

(Continued)

FOREIGN PATENT DOCUMENTS

| EP | 3248839 A1 | 11/2017 |
| KR | 102011890 B1 | 8/2019 |
| KR | 102011892 B1 | 8/2019 |

OTHER PUBLICATIONS

Espacenet English Translation of KR102011892B1 (Year: 2018).*
Ifixit, iPad Pro Teardown Review!, Nov. 11, 2015, Youtube (Year: 2015).*

*Primary Examiner* — James J Lee
*Assistant Examiner* — Andrew Sang Kim
(74) *Attorney, Agent, or Firm* — SLATER MATSIL, LLP

(57) ABSTRACT

An embodiment display apparatus for a vehicle includes a display unit designed to be accommodated inside an interior trim of the vehicle and configured to output outside image information captured by a camera and a moving unit configured to allow the display unit to be selectively pulled out from the interior trim and to allow the display unit to rotate in opposite directions in a state in which the display unit is pulled out.

17 Claims, 11 Drawing Sheets

(51) Int. Cl.
  *B60K 35/28*   (2024.01)
  *B60K 35/60*   (2024.01)
  *B60R 1/12*    (2006.01)
  *B60R 1/25*    (2022.01)
  *B60R 11/02*   (2006.01)
  *B60R 11/00*   (2006.01)

(56) References Cited

U.S. PATENT DOCUMENTS

| | | | |
|---|---|---|---|
| 2010/0318266 A1* | 12/2010 | Schaaf | B60N 2/0233 |
| | | | 701/49 |
| 2018/0201190 A1 | 7/2018 | O'Connell et al. | |
| 2020/0039440 A1* | 2/2020 | Ozawa | B60R 11/0223 |
| 2020/0369223 A1* | 11/2020 | Hansen | B32B 9/02 |
| 2022/0332252 A1* | 10/2022 | Erasala | B60J 5/0479 |

* cited by examiner

DISPLAY APPARATUS FOR VEHICLE

CROSS-REFERENCE TO RELATED APPLICATIONS

This application claims the benefit of Korean Patent Application No. 10-2021-0144168, filed on Oct. 27, 2021, which application is hereby incorporated herein by reference.

TECHNICAL FIELD

The present invention relates to a display apparatus for a vehicle.

BACKGROUND

Generally, a mirrorless vehicle is a vehicle equipped with a camera instead of a side mirror, and may be defined as a vehicle equipped with a camera instead of a side mirror and designed to identify outside conditions through an in-vehicle monitor.

That is, a side mirror is removed from a vehicle, but instead, a camera is installed at a side of a front door. Such a camera makes it easier to observe a side view and reduces blind spots as well as reduces air resistance to increase fuel efficiency and diversifies design compared to before. Accordingly, technologies that dramatically simplify a design of a side mirror by using a camera are emerging recently, and such a technology is called a camera monitor system (CMS).

A typical CMS is installed in a structure in which a camera with an angle of view of about 50° to 80° is fixed at a position where a field of view is secured in order to secure a rear view. Rear-view information obtained by the CMS may be provided to a driver through a display.

Recently, ahead of the era of autonomous driving of vehicles, it is expected that automobile display technology, which is an essential element of smart cars, will also develop rapidly. When a driver is freed from a steering wheel, the importance of an infotainment function provided to a driver and passengers will be more emphasized, and accordingly, the importance of a display, which is a medium that can deliver the infotainment function, will grow bigger over time.

Eventually, a display for a vehicle is expected to fill various spaces in the vehicle as well as a driver's seat. In particular, in a case of a display panel to which the above-described CMS is connected, the display panel is focused on improving driver convenience by providing rear-view information. However, such a display panel may interfere with visibility depending on a location where the display panel is installed, and may act as a factor that hinders freedom in interior vehicle design.

In order to solve such problems, a technology for installing a display panel on a door trim, for example, may be applied. However, in this case, a size of the display panel becomes relatively small, which may cause difficulties in securing visibility, and since the display panel is exposed to the outside, the display panel may always be exposed to the risk of damage.

The above information disclosed in this background section is only for enhancement of understanding of the background of the invention, and therefore it may contain information that does not form the prior art that is already known to a person of ordinary skill in the art.

SUMMARY

The present invention relates to a display apparatus for a vehicle. Particular embodiments relate to a display apparatus for a vehicle in which a display panel is provided to be accommodated inside a door trim of the vehicle, and pulled out to a height of an existing side mirror, thereby ensuring effective rearward visibility.

Embodiments of the present invention can solve problems associated with the prior art, and an embodiment of the present invention provides a display apparatus for a vehicle in which a display panel is provided to be accommodated inside a door trim of a vehicle so as to be selectively pulled out depending on driving conditions of the vehicle, whereby a rear view may be effectively secured by the structure of the display panel being pulled out to a height corresponding to a height of an existing side mirror, and due to the structure of being selectively pulled out, the display panel may be increased in size while preventing inhibition of design freedom.

One embodiment of the present invention provides a display apparatus for a vehicle, the display apparatus including a display unit accommodated inside an interior trim of the vehicle and configured to output outside image information captured by a camera, and a moving unit configured to allow the display unit accommodated inside the interior trim to be selectively pulled out from the interior trim, and to allow the display unit to rotate in opposite directions in a state in which the display unit is pulled out.

In a preferred embodiment, the moving unit may include a lifting portion coupled to a coupling mount provided in the display unit, and configured to guide the display unit to be pulled out while moving in a vertical direction along a lifting guide arranged upright inside the interior trim, and a rotating portion that fixes the lifting guide, and is configured to rotate the pulled out display unit by rotating the coupling mount including the lifting portion.

In another preferred embodiment, the moving unit may further include a slide movement portion mounted on a guide rail disposed in a horizontal direction inside the interior trim, and configured to allow the display unit pulled out from the interior trim to move while sliding along the guide rail in a state of being coupled to the rotating portion.

In still another preferred embodiment, the slide movement portion may include a mounting bracket connected to the rotating portion, an inner rail coupled to the mounting bracket and slidably mounted inside the guide rail, and a moving member coupled to the mounting bracket inside the inner rail and configured to move along a lead screw provided on the guide rail to guide a slide movement path of the mounting bracket.

In yet another preferred embodiment, the moving unit may allow the display unit to be operated by a controller. Here, the controller may allow a plurality of function screens to be selectively output on the display unit in a state in which the display unit is pulled out, and allow an operation to be controlled as the function screens are manipulated.

In still yet another preferred embodiment, the controller may output a function screen A of a door handle on the pulled out display unit when a transmission is determined to be in a park (P) position in an ignition OFF state of the vehicle, and may control opening of a door upon manipulation.

In a further preferred embodiment, the controller may output a function screen of an integrated memory system (IMS) on the pulled out display unit when an adaptive cruise control (ACC) or a transmission is determined to be in the P position in an ignition ON state of the vehicle, and may control a position of a seat upon manipulation.

In another further preferred embodiment, the display unit may include a display panel configured to output the outside image information, and a cover coupled to an upper surface of the display panel to shield a guide hole formed in the interior trim.

In still another further preferred embodiment, the cover may be made of a material identical to that of the interior trim, and may have a height identical to that of the interior trim when the display panel is pulled inside the interior trim through the guide hole.

In yet another further preferred embodiment, the display panel may be provided with a plurality of speakers, disposed at a rear side thereof and configured to output sound.

In still yet another further preferred embodiment, the interior trim may correspond to a door trim of the vehicle.

Other aspects and preferred embodiments of the invention are discussed infra.

It is to be understood that the term "vehicle" or "vehicular" or other similar terms as used herein is inclusive of motor vehicles in general, such as passenger automobiles including sport utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of the invention are discussed infra.

BRIEF DESCRIPTION OF THE DRAWINGS

The above and other features of embodiments of the present invention will now be described in detail with reference to certain exemplary embodiments thereof illustrated in the accompanying drawings which are given hereinbelow by way of illustration only, and thus are not limitative of the present invention, and wherein:

FIG. 1 is a view illustrating a state in which a display unit of a display apparatus for a vehicle according to an embodiment of the present invention is pulled in;

Figure 1:
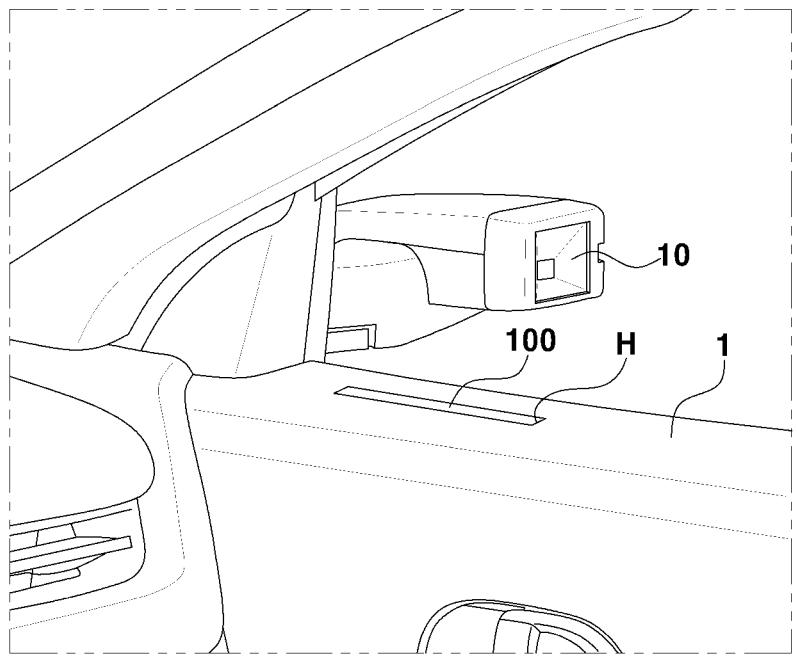

It should be understood that the appended drawings are not necessarily to scale, presenting a somewhat simplified representation of various preferred features illustrative of the basic principles of the invention. The specific design features of embodiments of the present invention as disclosed herein, including, for example, specific dimensions, orientations, locations, and shapes, will be determined in part by the particular intended application and use environment.

In the figures, reference numbers refer to the same or equivalent parts of embodiments of the present invention throughout the several figures of the drawing.

DETAILED DESCRIPTION OF ILLUSTRATIVE EMBODIMENTS

Description will now be given in detail according to preferred embodiments disclosed herein, with reference to the accompanying drawings.

Advantages and features of embodiments of the present invention, and a method of achieving the same, will be apparent with reference to the exemplary embodiments described below in detail in conjunction with the accompanying drawings.

However, the present invention may be embodied in many different forms, and should not be construed as being limited to the embodiments set forth herein. Rather, the embodiments are provided so that the present disclosure will be thorough and complete, and will fully convey the scope of the present invention to those skilled in the art. The present invention is defined only by the categories of the claims.

In describing embodiments of the present invention, if a detailed explanation of a related known function or construction is considered to unnecessarily obscure the gist of the present invention, such explanation has been omitted but would be understood by those skilled in the art.

Figure 2:
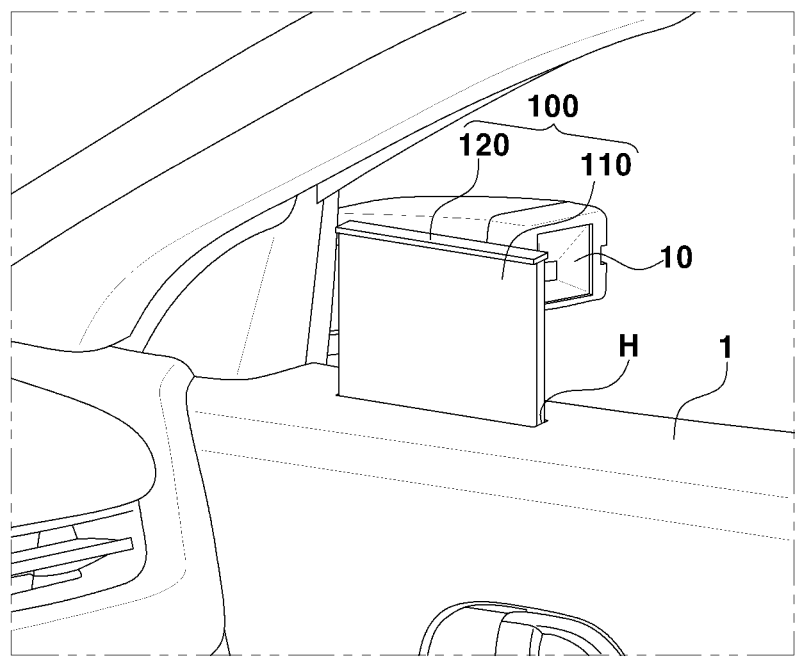
FIG. 2 is a view illustrating a state in which a display unit of a display apparatus for a vehicle according to an embodiment of the present invention is pulled out.
Figure 3:
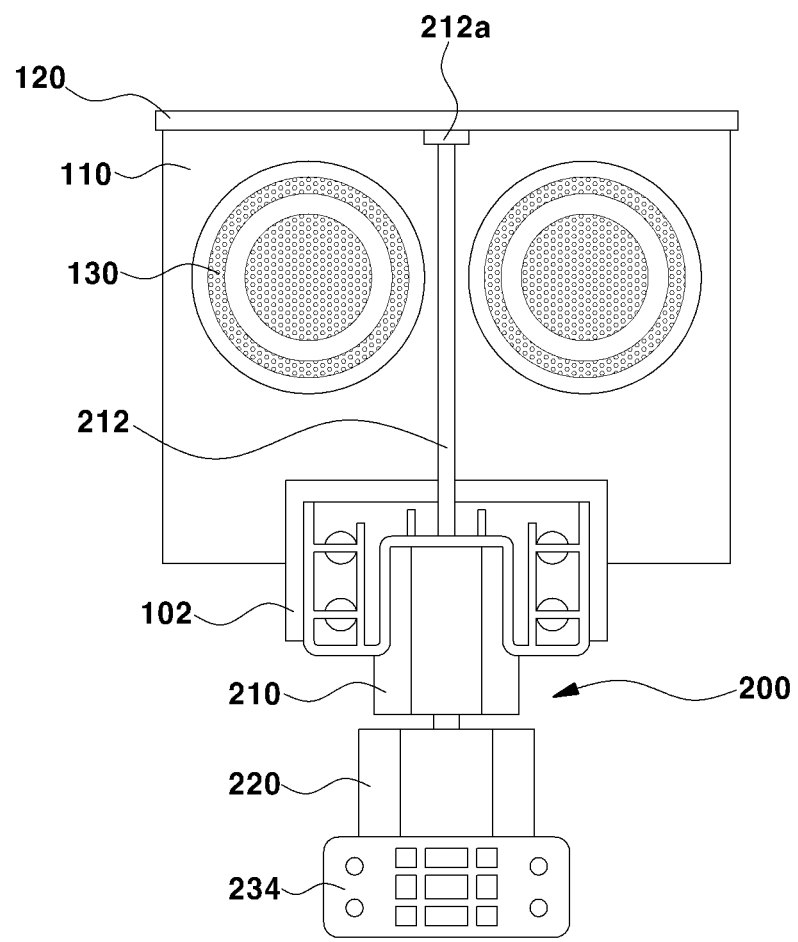
FIGS. 3 and 4 are views each illustrating a state in which a display unit of a display apparatus for a vehicle according to an embodiment of the present invention is lowered or raised.
Figure 4:
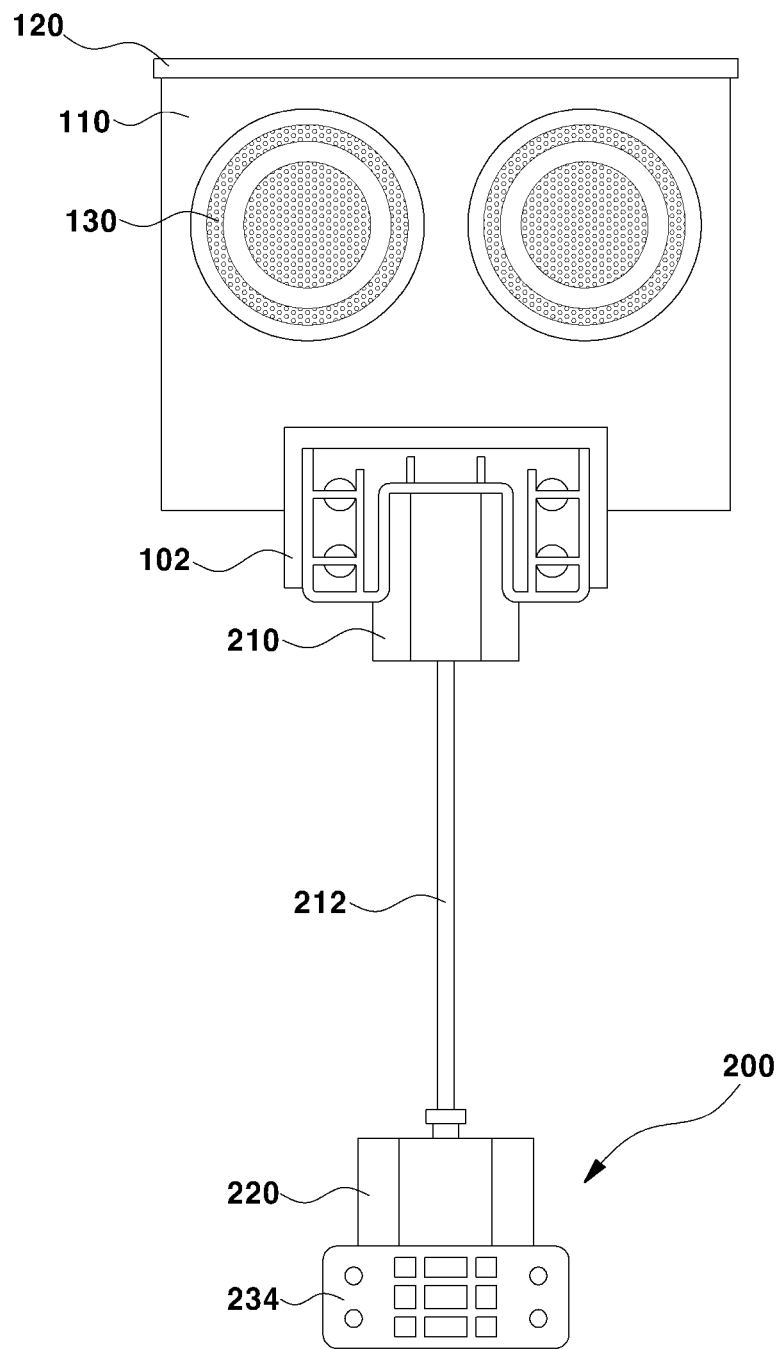

FIG. 1 is a view illustrating a state in which a display unit of a display apparatus for a vehicle according to an embodiment of the present invention is pulled in, FIG. 2 is a view illustrating a state in which a display unit of a display apparatus for a vehicle according to an embodiment of the present invention is pulled out, and FIGS. 3 and 4 are views each illustrating a state in which a display unit of a display apparatus for a vehicle according to an embodiment of the present invention is lowered or raised.

Figure 5:
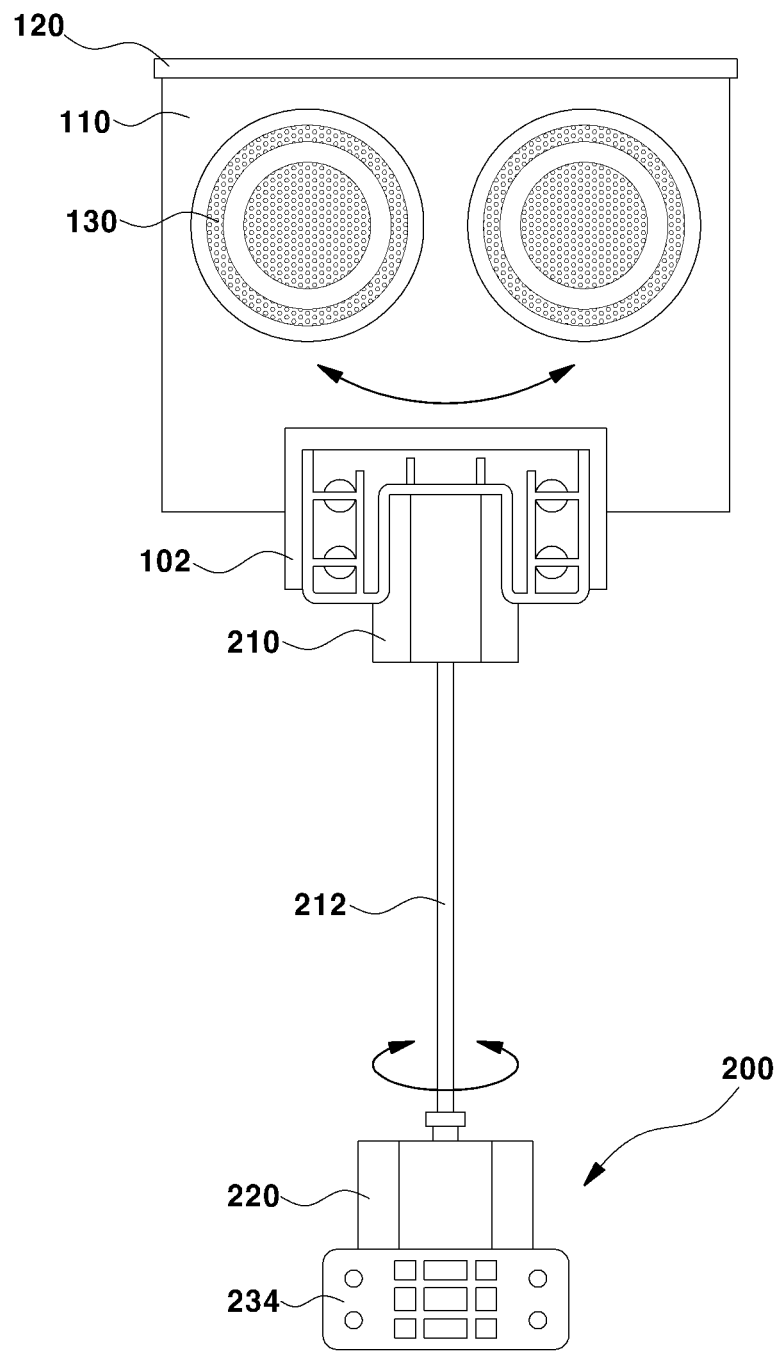
FIG. 5 is a view illustrating a state in which a display unit of a display apparatus for a vehicle according to an embodiment of the present invention rotates.
Figure 6:
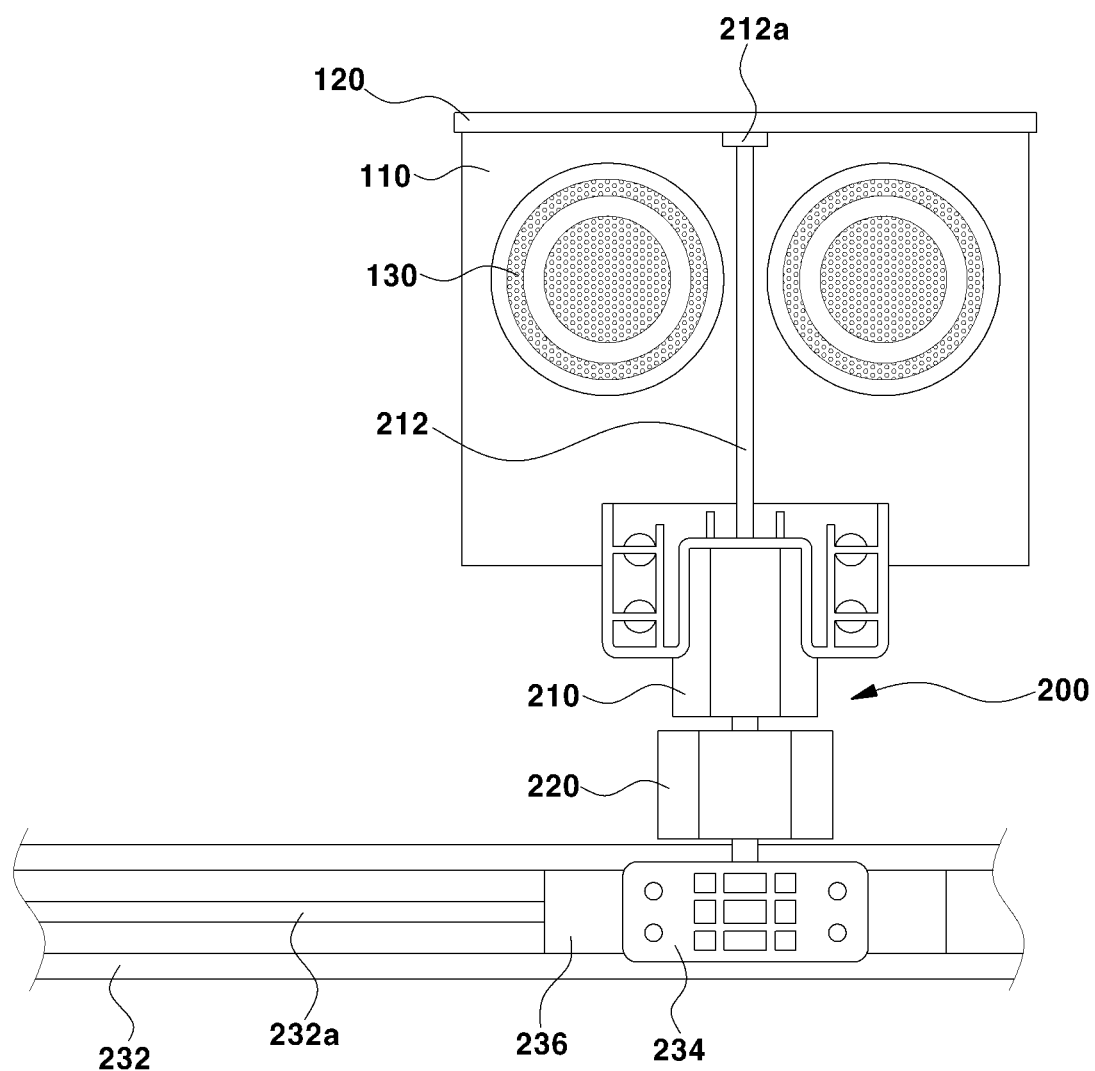
FIG. 6 is a view illustrating a slide movement of a display unit of a display apparatus for a vehicle according to an embodiment of the present invention.
Figure 7:
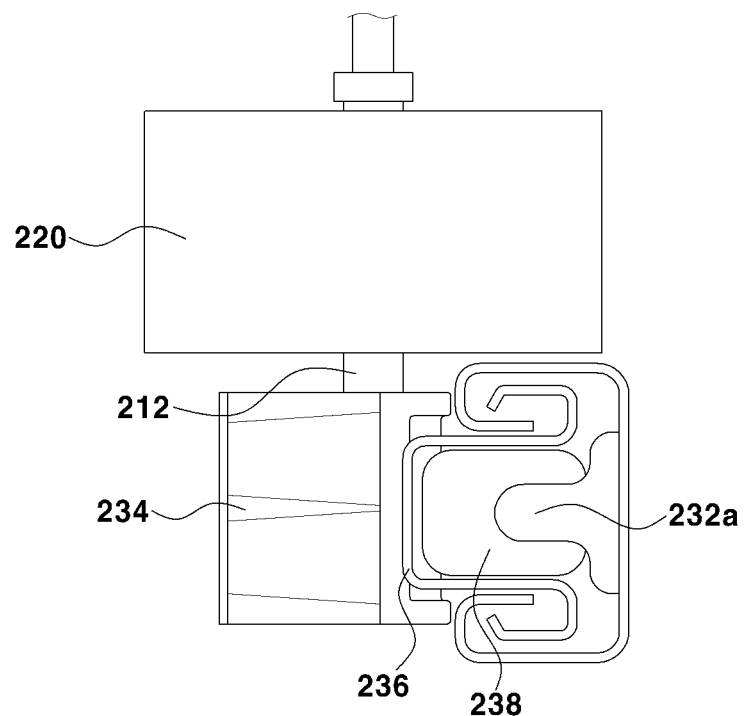
FIG. 7 is a cross-sectional view illustrating a structure of a display unit of a display apparatus for a vehicle according to an embodiment of the present invention.

FIG. 5 is a view illustrating a state in which a display unit of a display apparatus for a vehicle according to an embodiment of the present invention rotates, FIG. 6 is a view illustrating a slide movement of a display unit of a display apparatus for a vehicle according to an embodiment of the present invention, FIG. 7 is a cross-sectional view illustrating a structure of a display unit of a display apparatus for a vehicle according to an embodiment of the present invention.

Figure 8A:
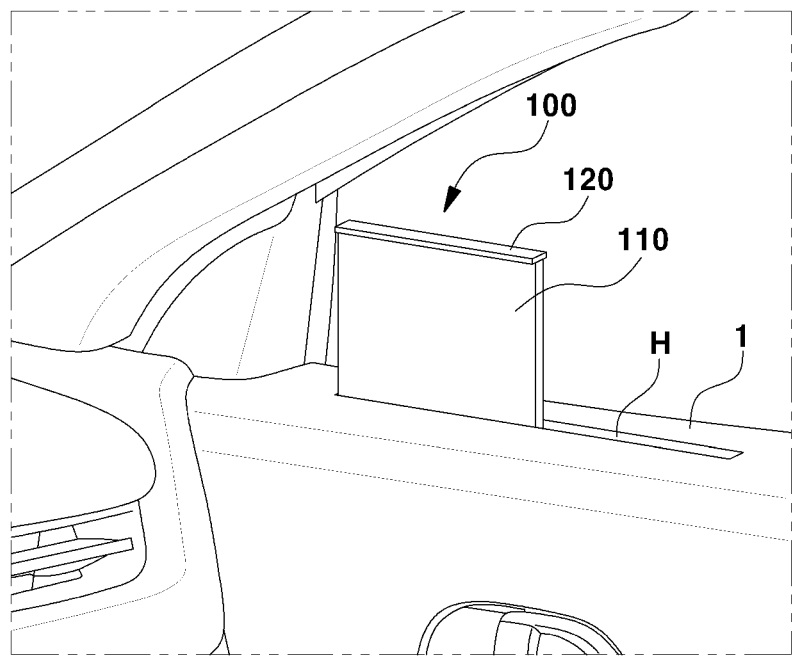
FIGS. 8A and 8B are views illustrating a slide movement of a display unit of a display apparatus for a vehicle according to an embodiment of the present invention.
Figure 8B:
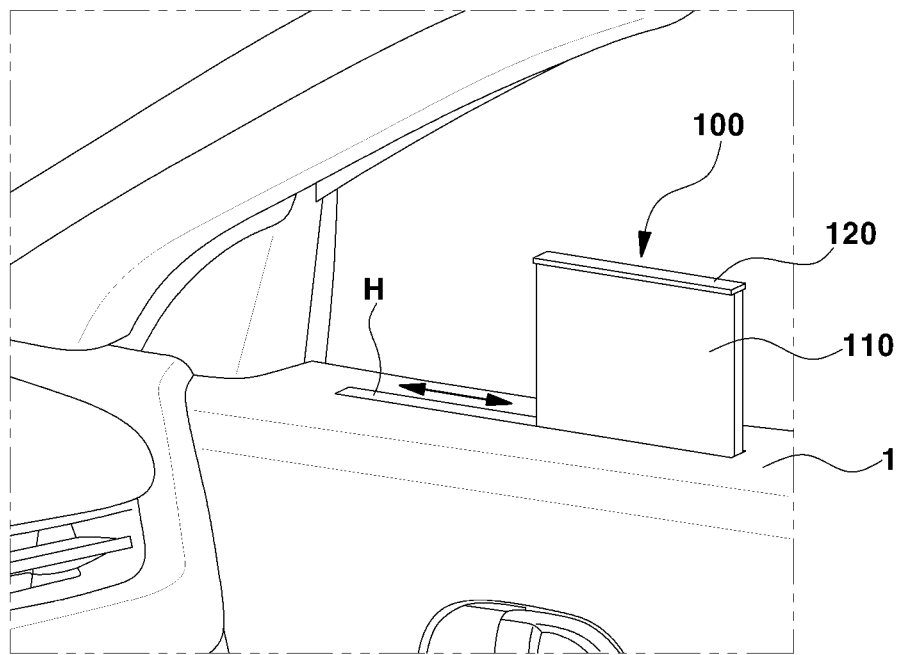
Figure 9:
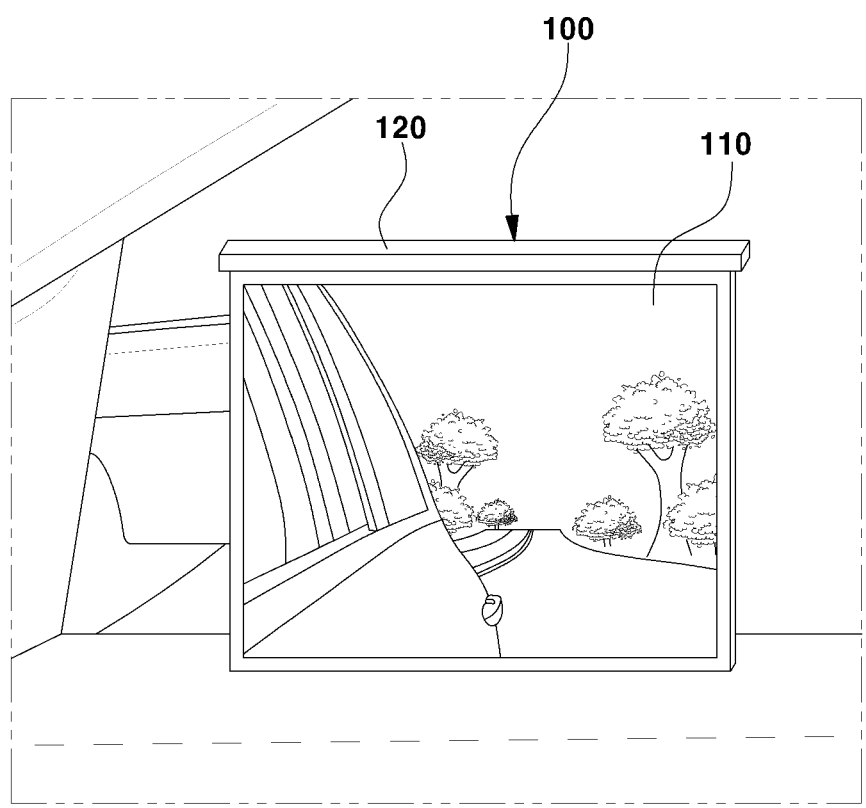
FIG. 9 is a view illustrating rear image information output on a display apparatus for a vehicle according to an embodiment of the present invention.
Figure 10:
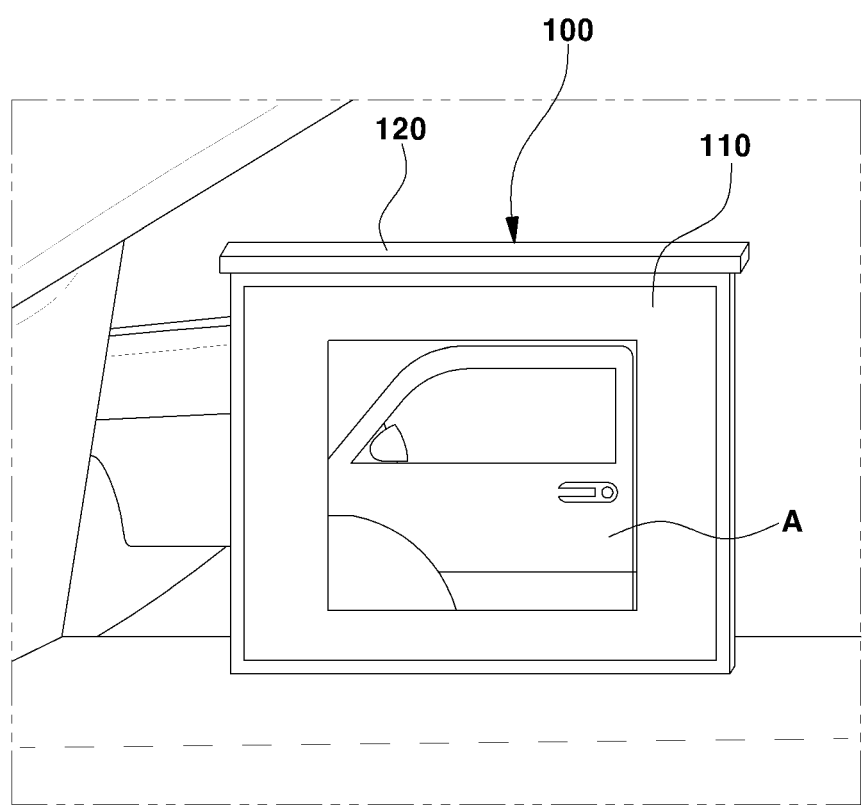
FIG. 10 is a view of a first embodiment illustrating a screen transition of a display unit of a display apparatus for a vehicle according to an embodiment of the present invention.
Figure 11:
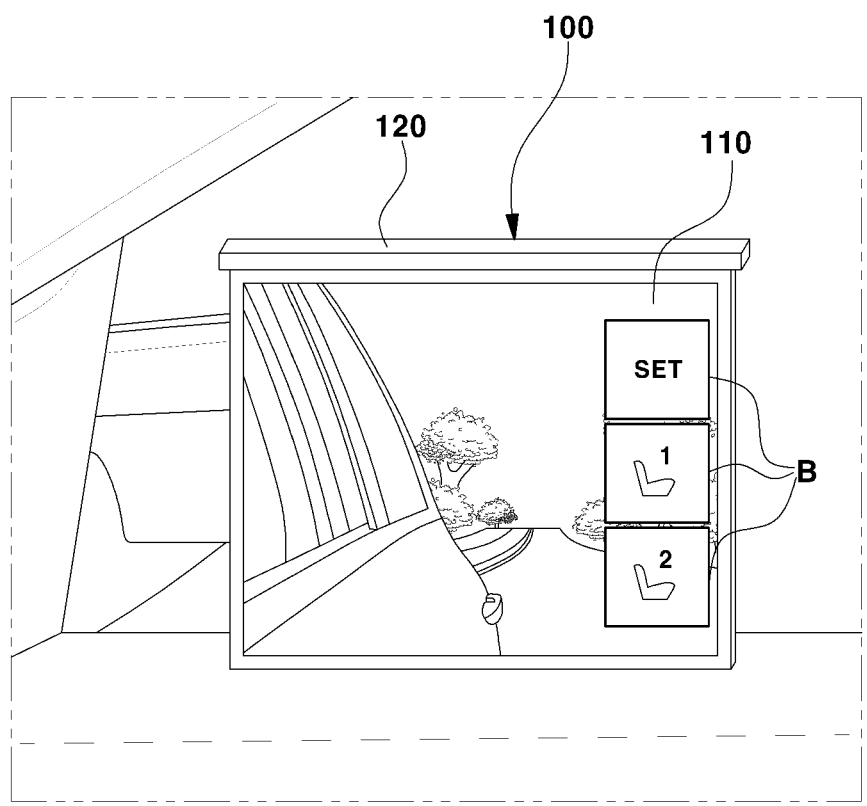
FIG. 11 is a view of a second embodiment illustrating a screen transition of a display unit of a display apparatus for a vehicle according to an embodiment of the present invention.

FIGS. 8A and 8B are views illustrating a slide movement of a display unit of a display apparatus for a vehicle according to an embodiment of the present invention, FIG. 9 is a view illustrating rear image information output on a display apparatus for a vehicle according to an embodiment of the present invention, FIG. 10 is a view of a first embodiment illustrating a screen transition of a display unit of a display apparatus for a vehicle according to an embodiment of the present invention, and FIG. 11 is a view of a second embodiment illustrating a screen transition of a display unit of a display apparatus for a vehicle according to an embodiment of the present invention.

As illustrated in FIGS. 1 and 2, a display apparatus for a vehicle according to this embodiment includes a display unit 100.

The display unit 100 is installed in an interior trim of a vehicle, specifically, in an upper portion of a door trim 1 inside the vehicle. The display unit 100 outputs an outside image, more specifically, rear image information, captured by a camera 10 mounted in place of a conventional side mirror, so that the rear image information can be checked from inside the vehicle.

Here, the display unit 100 has been described as being limited to being installed in the upper portion of the door trim 1. However, the display unit 100 may also be installed in a plurality of interior trims inside the vehicle, such as a crash pad.

The display unit 100 may be provided in a pair, each being disposed at a position corresponding to a position of an A-pillar side in the vehicle, more specifically, a position of the conventional side mirror. The display unit 100 may include a display panel no and a cover 120.

First, the display panel no may be implemented as a flat panel display, and may be configured to output rear image information to provide the rear image information to a driver.

In addition, the cover 120 is coupled to an upper surface of the display unit 100 so as to shield a guide hole H formed in the door trim 1.

Here, the cover 120 is made of a material identical to that of the door trim 1, and as the display panel no is pulled inside the door trim 1 through the guide hole H, the cover 120 has a height identical to that of an upper surface of door trim 1.

Meanwhile, the display unit 100 may be pulled inside the door trim 1 through the guide hole H formed in the door trim 1 (see FIG. 1), and may be selectively pulled out upon driver's request or an ignition ON state (see FIG. 2).

The display apparatus for a vehicle according to this embodiment may include a moving unit 200 as illustrated in FIG. 3 so that the display unit 100 can be selectively pulled in or pulled out as described above.

Such a moving unit 200 includes a lifting portion 210 and a rotating portion 220.

The lifting portion 210 is coupled to a coupling mount 102 provided in the display unit 100. The lifting portion 210 reciprocates along a lifting guide 212 disposed upright inside the door trim 1 and serves to lift the display unit 100 so that the display unit 100 is pulled out from the door trim 1.

In other words, since the lifting guide 212 is provided with a screw thread on an outer circumferential surface thereof and an inner side of the lifting portion 210 is screw-coupled with the lifting guide 212, when the lifting guide 212 rotates in opposite directions as power is applied, the screw-coupled lifting portion 210 reciprocates in a vertical direction, eventually allowing the entire display unit 100 including the coupling mount 102 to be pulled out from the door trim 1 as illustrated in FIG. 4.

More preferably, a height of the lifting portion 210 pulled out from the door trim 1 may be limited by a lift limiting member 212a protruding from one end of the lifting guide 212. Here, the limited height of the lifting portion 210 may correspond to a height of the conventional side mirror.

The rotating portion 220 fixes the lifting guide 212, and may allow the display unit 100, including the lifting portion 210 and pulled out from the door trim 1, to rotate in opposite directions by an angle within a predetermined range, more specifically, by an angle of about 10 degrees as illustrated in FIG. 5.

That is, a driver may rotate the display unit wo to a desired angle, in the state in which the display unit wo is pulled out, by manipulating a controller (not illustrated) to rotate the rotating portion 220 so that the lifting guide 212, the lifting portion 210, and the coupling mount 102 connected together are rotated as a whole.

As such, since the display unit wo can be rotated to correspond to a driver's visibility, the output of rear image information can be effectively checked through a driver's manipulation.

In addition, the moving unit 200 may further include a slide movement portion (not shown).

The slide movement portion (not shown) is mounted on a guide rail 232 disposed in a horizontal direction inside the door trim 1. The slide movement portion (not shown) may allow the display unit wo to slide together with the lifting portion 210, a motor (or the rotating portion) 220, and the coupling mount 102 as illustrated in FIG. 6, while sliding along the guide rail 232.

To this end, the slide movement portion (not shown) includes a mounting bracket 234, an inner rail 236, and a moving member 238 as illustrated in FIG. 7.

The mounting bracket 234 passes through the motor (or the rotating portion) 220 so as to be connected to the extended lifting guide 212.

The inner rail 236 is coupled to the mounting bracket 234 and is slidably mounted inside the guide rail 232.

That is, since opposite ends of the inner rail 236 are curved in the vertical direction so as to be rail-coupled to an inner side of the guide rail 232, the inner rail 236 is slidable with respect to the mounting bracket 234.

The moving member 238, coupled to the mounting bracket 234 inside the inner rail 236, moves along a typical lead screw 232a provided on the guide rail 232 so as to guide a slide movement path of the mounting bracket 234.

Accordingly, the moving member 238 slides inside the guide rail 232 along the inner rail 236, and thus the mounting bracket 234, the rotating portion 220 connected to the mounting bracket 234, and the display unit 100 including the lifting portion 210 may slide all together. This may allow the display unit 100 pulled up above the door trim 1 to slide along the extended guide hole H as illustrated in FIGS. 8A and 8B so as to be positioned where it is easy to secure a driver's visibility.

Meanwhile, the above-described moving unit 200 is operated by a controller (not illustrated) depending on driver manipulation. In the case of such a controller, a function screen may be selectively output on the display unit 100 in a state in which the display unit 100 is pulled out, and an operation thereof may be controlled as the function screen is manipulated.

That is, upon an ignition ON state, the display unit 100 is pulled up above the door trim 1 by the moving unit 200, and in the state in which the display unit 100 is pulled out in this way, rear image information is output as illustrated in FIG. 8. Here, when it is determined that the ignition ON state is switched to an ignition OFF state and that a transmission is switched from the drive (D), reverse (R), or neutral (N) position to the park (P) position, the controller (not illustrated) may output an image of a function screen A of a door handle on the display unit 100 as illustrated in FIG. 10.

Here, when a driver manipulates an image of a function screen A of a corresponding door handle through a touch operation, the controller (not illustrated) may control a vehicle door to be opened.

This is to replace a door inner handle generally mounted on the door trim 1. Here, the door inner handle is removed, and the function of the door inner handle is replaced by a mechanism in which the function screen A of the door handle is output and the door is opened by a touch operation when, for example, it is determined that an engine is switched to the OFF state and the transmission is in the P position as described above and it is predicted that the driver may exit the vehicle. As such, structural simplification of the door trim 1 can be implemented.

In addition, when an adaptive cruise control (ACC) or a transmission is determined to be in the P position in an ignition ON state of the vehicle, the controller may output a function screen B of an integrated memory system (IMS) upon request of a driver's input as illustrated in FIG. 11, and may control a seat to be moved to a set position by manipulation of the output function screen B of the IMS through a touch operation.

As described above, such a mechanism enables structural simplification of the door trim 1, and a plurality of function buttons to be mounted on the door trim 1 may be replaced by buttons of the IMS which are selectively output on the display unit 100 to thereby reduce manufacturing cost and weight of a door.

Apart from the above, the controller (not illustrated) may also allow an existing side mirror position adjustment switch installed on the door trim 1 to be selectively output on the display unit 100, and may allow the side mirror position adjustment switch to be controlled through a touch operation, more specifically, by moving a finger to a desired position on the display unit 100.

Moreover, for structural simplification of the door trim 1, an existing speaker mounted on the door trim 1 may also be removed. That is, a plurality of speakers 130 configured to output sound is installed at the rear side of the display unit 100 (see FIGS. 3 to 5), and when a driver's manipulation is applied in a state in which the display unit 100 is pulled out, sound may be output through the speakers 130.

As is apparent from the above description, embodiments of the present invention provide the following effects.

In embodiments of the present invention, a display panel is provided to be accommodated inside a door trim of a vehicle so as to be selectively pulled out depending on driving conditions of the vehicle, whereby a rear view may be effectively secured by the structure of the display panel being pulled out to a height corresponding to a height of an existing side mirror, and due to the structure of being selectively pulled out, the display panel may be increased in size while preventing inhibition of design freedom.

In addition, embodiments of the present invention have an effect of improving operation and user convenience by enabling the display panel to slide and rotate to correspond to a driver's seat position.

Moreover, in embodiments of the present invention, a speaker is mounted on a rear side of the display panel instead of being mounted on the door trim, and a plurality of function switches which has been mounted on a conventional door trim is replaced by, for example, a door inner handle, a side mirror control switch, an integrated memory system (IMS) switch, etc. implemented on a touch-type display panel, thereby simplifying the structure of the door trim and improving usability.

In the above, embodiments of the present invention have been described with reference to the accompanying drawings. However, those skilled in the art to which the present invention pertains will understand that various modifications may be made therefrom, and that all or part of the above-described embodiment(s) may be selectively combined. Therefore, the true technical protection scope of the present invention should be determined by the technical ideas of the appended claims.

What is claimed is:

1. A display apparatus for a vehicle, the display apparatus comprising:
    a display unit designed to be accommodated inside an interior trim of the vehicle and configured to output outside image information captured by a camera; and
    a moving unit configured to allow the display unit to be selectively pulled out from the interior trim and to allow the display unit to rotate in opposite directions in a state in which the display unit is pulled out,
    wherein the moving unit comprises:
        a lifting portion coupled to a coupling mount provided in the display unit, the lifting portion configured to guide the display unit to be pulled out while moving in a vertical direction along a lifting guide designed to be arranged upright inside the interior trim;
        a rotating portion configured to fix the lifting guide and to rotate the pulled out display unit by rotating the coupling mount including the lifting portion; and
        a slide movement portion mounted on a guide rail designed to be disposed in a horizontal direction inside the interior trim, the slide movement portion configured to allow the display unit to be pulled out from an extended guide hole formed in the interior trim to move while sliding along the guide rail in a state of being coupled to the rotating portion.

2. The display apparatus of claim 1, wherein the slide movement portion comprises:
    a mounting bracket connected to the rotating portion;
    an inner rail coupled to the mounting bracket and slidably mounted inside the guide rail; and
    a moving member coupled to the mounting bracket inside the inner rail and configured to move along a lead screw provided on the guide rail to guide a slide movement path of the mounting bracket.

3. The display apparatus of claim 1, wherein:
    the moving unit is configured to allow the display unit to be operated by a controller; and
    the controller is configured to allow a plurality of function screens to be selectively output on the display unit in a state in which the display unit is pulled out and to allow an operation to be controlled as the function screens are manipulated.

4. The display apparatus of claim 3, wherein the controller is configured to output a function screen of a door handle on the pulled out display unit when a transmission is determined to be in a parked position in an ignition OFF state of the vehicle and to control opening of a door upon manipulation of the function screen.

5. The display apparatus of claim 3, wherein the controller is configured to output a function screen of an integrated memory system on the pulled out display unit when an adaptive cruise control or a transmission is determined to be in a parked position in an ignition ON state of the vehicle and to control a position of a seat upon manipulation of the function screen.

6. The display apparatus of claim 1, wherein the display unit comprises:
   a display panel configured to output the outside image information; and
   a cover coupled to an upper surface of the display panel to shield a guide hole formed in the interior trim.

7. The display apparatus of claim 6, wherein the cover comprises a same material as that of the interior trim and has a same height as that of the interior trim when the display panel is accommodated inside the interior trim through the guide hole.

8. The display apparatus of claim 6, wherein the display panel comprises a plurality of speakers, disposed at a rear side thereof and configured to output sound.

9. The display apparatus of claim 1, wherein the interior trim comprises a door trim of the vehicle.

10. A vehicle comprising:
    a vehicle body;
    a door coupled to the vehicle body, the door comprising an interior trim comprising a guide hole and an opening within the interior trim accessible through the guide hole;
    a camera mounted to an exterior region of the vehicle;
    a display unit disposed inside the opening; and
    a moving unit disposed within the interior trim and configured to allow the display unit to be selectively pulled out from the opening and to allow the display unit to rotate in opposite directions in a state in which the display unit is pulled out,
    wherein the moving unit comprises:
        a lifting portion coupled to a coupling mount provided in the display unit, the lifting portion configured to guide the display unit to be pulled out while moving in a vertical direction along a lifting guide arranged upright inside the interior trim;
        a rotating portion configured to fix the lifting guide and to rotate the pulled out display unit by rotating the coupling mount including the lifting portion; and
        a slide movement portion mounted on a guide rail disposed in a horizontal direction inside the interior trim, the slide movement portion configured to allow the display unit to be pulled out from an extended guide hole formed in the interior trim to move while sliding along the guide rail in a state of being coupled to the rotating portion.

11. The vehicle of claim 10, wherein the slide movement portion comprises:
    a mounting bracket connected to the rotating portion;
    an inner rail coupled to the mounting bracket and slidably mounted inside the guide rail; and
    a moving member coupled to the mounting bracket inside the inner rail and configured to move along a lead screw provided on the guide rail to guide a slide movement path of the mounting bracket.

12. The vehicle of claim 10, wherein:
    the moving unit is configured to allow the display unit to be operated by a controller; and
    the controller is configured to allow a plurality of function screens to be selectively output on the display unit in a state in which the display unit is pulled out and to allow an operation to be controlled as the function screens are manipulated.

13. The vehicle of claim 10, wherein the display unit comprises:
    a display panel configured to output outside image information from the camera; and
    a cover coupled to an upper surface of the display panel to shield the guide hole formed in the interior trim when the display unit is disposed inside the opening.

14. The vehicle of claim 13, wherein the display panel comprises a plurality of speakers, disposed at a rear side thereof and configured to output sound.

15. A method of providing a display apparatus for a vehicle, the method comprising:
    providing a display unit designed to be accommodated inside an interior trim of the vehicle, wherein the display unit comprises a display panel that outputs outside image information captured by a camera and a cover coupled to an upper surface of the display panel to shield a guide hole formed in the interior trim; and
    providing a moving unit that allows the display unit to be selectively pulled out from the interior trim and that allows the display unit to rotate in opposite directions in a state in which the display unit is pulled out, wherein the moving unit comprises:
        a lifting portion coupled to a coupling mount provided in the display unit, the lifting portion guiding the display unit to be pulled out while moving in a vertical direction along a lifting guide arranged upright inside the interior trim;
        a rotating portion fixing the lifting guide and rotating the pulled out display unit by rotating the coupling mount including the lifting portion; and
        a slide movement portion mounted on a guide rail disposed in a horizontal direction inside the interior trim, the slide movement portion allowing the display unit to be pulled out from an extended guide hole formed in the interior trim to move while sliding along the guide rail in a state of being coupled to the rotating portion.

16. The method of claim 15, further comprising providing a controller to operate the display unit, wherein the controller allows a plurality of function screens to be selectively output on the display panel in a state in which the display unit is pulled out and to allow an operation to be controlled as the function screens are manipulated.

17. The method of claim 16, wherein the display panel comprises a speaker that outputs sound and is disposed at a rear side of the display panel.

* * * * *